March 4, 1947.　　　E. C. HARTLEY　　　2,416,829
CLOSURE CAP FOR TUBE FITTING
Filed Dec. 29, 1944
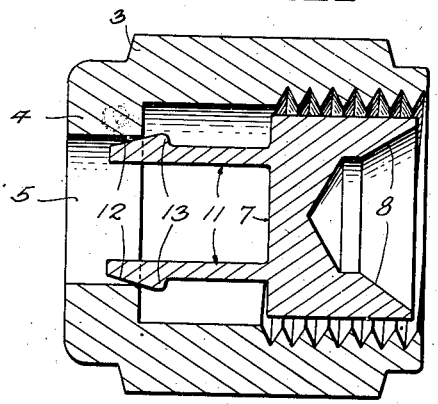
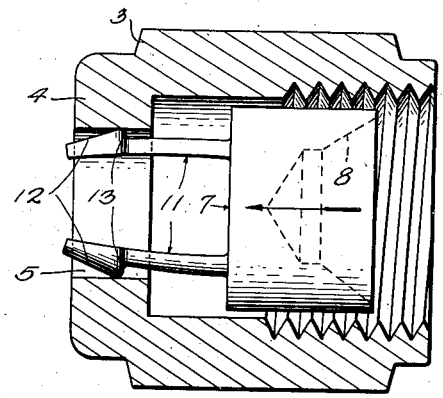
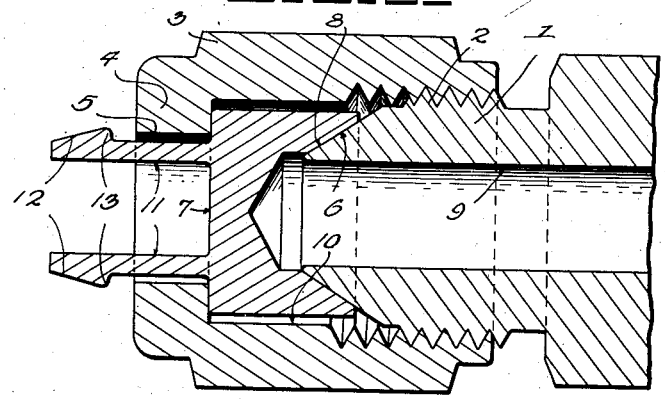
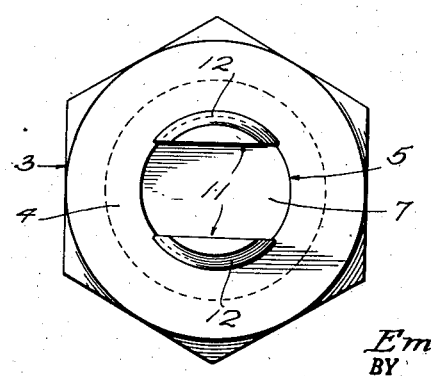
INVENTOR.
Emmett C. Hartley.
BY
Mason, Porter & Diller
Attys Patented Mar. 4, 1947

2,416,829

UNITED STATES PATENT OFFICE 2,416,829

CLOSURE CAP FOR TUBE FITTINGS

Emmett C. Hartley, Cleveland, Ohio, assignor to The Parker Appliance Company, Cleveland, Ohio, a corporation of Ohio Application December 29, 1944, Serial No. 570,364

3 Claims. (Cl. 138—89)

The patent granted Arthur L. Parker August 20, 1940, No. 2,212,183, shows a fitting to which the flared end of a tube is clamped. The fitting includes a male member to which the tube is to be attached, a sleeve, and a nut.

It is sometimes found desirable to disconnect the tube and to close the fitting to which the tube was attached. This has been accomplished by substituting for the sleeve of the coupling a closure cap which is secured to the fitting by means of the nut.

An object of the present invention is to provide a cap for closing a fitting of the above type wherein the closure cap is housed within the nut and is secured to the nut by yielding devices which form a part of the closure cap.

A further object of the invention is to provide a closure cap of the above type wherein the yielding devices are formed integrally with the cap and so disposed that they may be inserted through the nut opening and thereby the cap attached to the nut as a unit.

In the drawings,

Figure 1 is a view in longitudinal section showing a nut having the closure cap inserted therein with the ends of the holding devices inserted a short distance into the nut opening.

Figure 2 is a view similar to Figure 1 with the cap in full side view and with the holding devices further inserted into the nut opening.

Figure 3 is a view in longitudinal section showing the cap and nut as a unit attached to the tube fitting and closing the same.

Figure 4 is an end view of the nut and cap shown in Figure 3.

As has already been noted the improvement has to do with a closure cap for a tube fitting of the type shown in the Parker patent, supra. The fitting includes a body member 1 which is rigidly attached to the part to which a tube is to be connected. This body member is provided with a threaded portion 2 to which a nut 3 is attached. The nut 3 at its outer end has an inwardly extending flange 4 provided with an opening 5 therethrough through which the tube extends. The body member 1 is provided with a tapered portion 6 which serves as a seat for the flared end of the tube which is to be connected to said body member.

The closure cap indicated at 7 is provided with an annular sealing surface 8 which is shaped to conform to the seat 6 on the body member 1. The cap extends all the way across the bore 9 in the body member and, when forced into contact with the seat 6 thereon, will close and seal the opening through the body member 1.

The cap is cylindrical in shape and is dimensioned so as to fit loosely within the nut leaving a clearance space 10 between the cap and the nut. The cap is provided with two holding devices 11, 11. These holding devices as shown are formed integrally with the cap. At the outer end of each holding device there is a laterally projecting portion the outer face of which is tapered as indicated at 12. This projecting portion provides a shoulder 13. The projecting portions are so dimensioned that the outer faces thereof at the ends of the holding devices are a lesser distance apart than the diameter of the opening in the nut. The inner ends of these projecting portions, however, are a greater distance apart than the diameter of the opening in the nut.

When the cap is inserted in the nut the outer end portions of the holding devices will enter the opening and when the cap is pressed into the nut these hodling devices will yield as shown in Figure 2, so that the projecting portions will pass through the opening to the outer face of the nut. As soon as they are all the way through the opening then they will spring apart so that the shoulders 13, 13 will prevent the cap from falling out of the nut. In other words, the cap and the nut are thus attached together as a unit. By pressing the two projecting ends of the holding devices toward each other the cap may be released from the nut.

When it is desired to close the opening after a tube has been removed, the closure cap is inserted in the nut in the manner above described and then the nut is threaded onto the body portion of the fitting 1. The body portion of the cap is of larger diameter than the opening in the nut and, therefore, the nut will engage the cap and force it onto the seat 6. Inasmuch as the cap is loosely fitted within the nut the sealing surface of the cap which is made to conform to the seat 6 will make contact throughout with the seat and the nut will firmly hold the cap in sealed connection with the fitting.

When it is desired to open the fitting and attach a tube thereto then the nut is removed, the cap taken out of the nut, and a clamping sleeve inserted for clamping the tube end against the seat 6 on the fitting.

While the holding devices have been shown as formed integrally with the cap, it will be understood that they may be otherwise constructed but it is essential that they shall be carried by and become a part of the cap so that they will always be ready for the attaching of the cap to the nut merely by pressure.

What I claim is:

1. A closure cap for a tube fitting comprising a fitting member having a tapered seat adapted to receive the flared end of a tube and a bore opening through said seat, a nut having a threaded connection with said fitting and an opening therethrough, and a closure cap disposed within and movable in said nut and having a sealing surface shaped to conform to the seat on the fitting for the closing of the fitting when the nut is threaded onto the same, said cap having yieldable devices adapted to engage said nut for securing said cap and nut together as a unit, and said nut and cap having cooperatively engageable shoulders effective upon threading of the nut onto the fitting member to force the cap into sealing contact with said seat.

2. A closure cap for a tube fitting comprising a fitting member having a tapered seat adapted to receive the flared end of a tube and a bore opening through said seat, a nut having a threaded connection with said fitting and an opening therethrough, and a closure cap disposed within and movable in said nut and having a sealing surface shaped to conform to the seat on the fitting for the closing of the fitting when the nut is threaded onto the same, said cap having a pair of yieldable devices formed integrally therewith adapted to be inserted through the opening in the nut and provided with projecting shoulders for securing said cap and nut together as a unit, and said nut and cap having cooperatively engageable shoulders effective upon threading of the nut onto the fitting member to force the cap into sealing contact with said seat.

3. A closure cap for a tube fitting comprising a fitting member having a seat adapted to receive the flared end of a tube and a bore opening through said seat, a nut having a threaded connection with said fitting and an opening therethrough, and a closure cap disposed within and movable in said nut and having a sealing surface adapted to conform to the seat on the fitting for the closing of the fitting when the nut is threaded onto the same, said cap having a pair of yieldable devices formed integrally therewith adapted to be inserted through the opening in the nut and provided with projecting shoulders for securing said cap and nut together as a unit, and said nut and cap having cooperatively engageable shoulders effective upon threading of the nut onto the fitting member to force the cap into sealing contact with said seat, each said device having a tapered outer wall engageable with the nut opening and terminating at one end in an end extremity spaced a distance from the cap axis less than the radius of said nut opening and at its other end merging into the respective shoulder projection at a point spaced from the cap axis a distance greater than said nut opening radius.

EMMETT C. HARTLEY.

REFERENCES CITED

The following references are of record in the file of this patent:

UNITED STATES PATENTS

| Number | Name | Date |
|---|---|---|
| 115,917 | Wharton | June 13, 1871 |
| 330,502 | McFarland | Nov. 17, 1885 |
| 1,944,951 | Ross | Jan. 30, 1934 |
| 373,825 | Gleich et al. | Nov. 29, 1887 |
| 551,829 | Mitchell | Dec. 24, 1895 |
| 2,212,183 | Parker | Aug. 20, 1940 |